United States Patent
Thangaraj et al.

(10) Patent No.: US 7,529,902 B2
(45) Date of Patent: May 5, 2009

(54) METHODS AND SYSTEMS FOR LOCKING IN STORAGE CONTROLLERS

(75) Inventors: Senthil M. Thangaraj, Fremont, CA (US); Paresh Chatterjee, Fremont, CA (US); Basavaraj G. Hallyal, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 197 days.

(21) Appl. No.: 11/253,368

(22) Filed: Oct. 19, 2005

(65) Prior Publication Data
US 2007/0088928 A1   Apr. 19, 2007

(51) Int. Cl.
G06F 12/06   (2006.01)
(52) U.S. Cl. ...................................... 711/163
(58) Field of Classification Search ................... 711/163
See application file for complete search history.

(56) References Cited

U.S. PATENT DOCUMENTS 7,167,960 B2 *   1/2007   Kodama et al. ............. 711/162

2003/0200398 A1 *   10/2003   Harris ........................ 711/152

* cited by examiner

Primary Examiner—Hyung S Sough
Assistant Examiner—Hamdy S Ahmed
(74) Attorney, Agent, or Firm—Duft Bornsen & Fishman LLP (57) ABSTRACT

Methods and systems for improved lock processing in a storage controller. Storage controllers that provide storage management features such as RAID storage controllers may concurrently process I/O requests received from attached host systems and I/O requests generated internally by the management processing in the controller. Such concurrent processing is coordinated by lock processing that allows affected storage areas to be locked during processing of an I/O operation. Features and aspects hereof allow such lock processing to lock regions flexibly defined by the controller. The flexible definition of the regions to be locked allows variance in the granularity of the locks required. Smaller granularity permits more concurrent I/O requests to be processed.

21 Claims, 5 Drawing Sheets

METHODS AND SYSTEMS FOR LOCKING IN STORAGE CONTROLLERS

BACKGROUND OF THE INVENTION

1. Field of the Invention

The invention relates to locking within a storage controller and in particular relates to locking of flexibly defined regions of storage in a storage subsystem to avoid conflicts when processing multiple requests substantially concurrently.

2. Discussion of Related Art

Storage subsystems have evolved along with associated computing subsystems to improve performance, capacity, and reliability. Redundant arrays of independent disks (i.e., "RAID" subsystems) provide improved performance by utilizing striping features and provide enhanced reliability by adding redundancy information. Performance is enhanced by utilization of so called "striping" features in which one I/O request for reading or writing is distributed over multiple simultaneously active disk drives to thereby spread or distribute the elapsed time waiting for completion over multiple, simultaneously operable disk drives. Redundancy is accomplished in RAID subsystems by adding redundancy information such that the loss/failure of a single disk drive of the plurality of disk drives on which the host data and redundancy information are written will not cause loss of data. Despite the loss of a single disk drive, no data will be lost though in some instances the logical volume will operate in a degraded performance mode.

RAID storage management techniques are known to those skilled in the art by a RAID management level number. The various RAID management techniques are generally referred to as "RAID levels" and have historically been identified by a level number. RAID level 5, for example, utilizes exclusive-OR ("XOR") parity generation and checking for such redundancy information. Whenever data is to be written to the storage subsystem, the data is "striped" or distributed over a plurality of simultaneously operable disk drives. In addition, XOR parity data (redundancy information) is generated and recorded in conjunction with the supplied data from the write request. In like manner, as data is read from the disk drives, striped information may be read from multiple, simultaneously operable disk drives to thereby reduce the elapsed time overhead required completing a given read request. Still further, if a single drive of the multiple independent disk drives fails, the redundancy information is utilized to continue operation of the associated logical volume containing the failed disk drive. Read operations may be completed by using remaining operable disk drives of the logical volume and computing the exclusive-OR of all blocks of a stripe that remain available to thereby re-generate the missing or lost information from the inoperable disk drive. Such RAID level 5 storage management techniques for striping and XOR parity generation and checking are well known to those of ordinary skill in the art.

Other RAID storage management levels provide still other degrees of improved reliability and/or performance. In addition, a number of high performance storage systems may utilize striping without the need for enhanced reliability afforded by RAID storage management techniques. As used herein, "storage subsystem" or "storage system" refers to all such storage methods and structures where striping and/or RAID storage management techniques are employed.

Typically storage subsystems include a storage controller responsible for managing and coordinating overall operation of the storage subsystem. The storage controller is generally responsible for receiving and processing I/O requests from one or more attached host systems requesting the reading or writing of particular identified information. In addition, the internal architecture of methods operable within the storage controller may frequently generate additional I/O requests. For example, in the context of a RAID level 5 storage subsystem, additional read and write I/O operations may be generated to retrieve and store information associated with the generation and checking of the exclusive-OR parity information managed by the storage controller. In like manner, additional I/O requests may be generated within a storage controller when rebuilding or regenerating a RAID logical volume in response to failure and replacement of one or more storage devices. Still further, other internally generated I/O operations may relate to reorganizing information stored in a volume of a storage subsystem. For example, information may be compacted or defragmented in various manners such that data may be moved from one portion or region of a storage system to another portion or region. Those of ordinary skill in the art will readily recognize a wide variety of operations that may be performed by a storage controller of the storage system that may generate I/O requests internal to the storage controller to be processed substantially concurrently with other internally generated I/O requests and substantially concurrently with ongoing I/O requests received from attached host systems.

When a storage controller is processing such a mixture of I/O requests generated from external sources (e.g., attached host systems) or generated internally to the storage controller, it is necessary for the storage controller to appropriately coordinate the operations to assure integrity of the affected data. One common approach generally known in the art for coordinating such processing is to lock portions of the storage capacity of the storage system to assure temporary exclusive access to affected information. Once temporary exclusive access is granted for processing of one I/O request, other I/O requests may be held in abeyance, queued for later processing, until the current I/O request has completed.

In the past, such locking was performed on large portions of the storage capacity as distinct from small smaller higher granularity portions of a storage system. For example, the entire capacity of a logical volume could be locked while one I/O request is processed to assure that other I/O requests being performed by the storage controller do not interfere. In like manner, but with smaller granularity, where striping of a storage volume is utilized, an entire stripe may be locked during performance of the first I/O request to prevent interference from other I/O requests handled by the storage controller. Heretofore, complexity and performance problems have largely precluded locking at a still smaller levels of granularity. The ability to lock smaller portions (i.e., smaller granularity) of the storage volume capacity allows more parallel processing to be performed by a storage controller. In other words, multiple I/O requests may be handled by a storage controller so long as the affected data does not overlap in a matter to present a conflict resulting in loss of data integrity.

It is evident from the above-described and that a need exists for improved methods and structures to permit locking within a storage controller utilizing more flexibly defined granularity without significantly impacting desired levels of performance.

SUMMARY OF THE INVENTION

The present invention solves the above and other problems, thereby advancing the state of the useful arts, by providing methods and associated systems to permit simplified locking of controller defined regions of the storage subsystem capacity to permit a higher degree of parallelism in the processing of the storage controller without risking loss of data integrity. More specifically, features and aspects hereof provide for defining smaller portions referred to as "regions" for purposes of locking. The size and hence number of regions spanning the capacity of a storage volume may be flexibly determined in accordance with the needs of the particular storage system application. A storage controller is responsible for performing I/O requests generated either from an external host system or generated internally by the storage controller management techniques. In one aspect hereof, such a controller may include methods and structures for acquisition of a lock appropriate for the particular operation to be performed and subsequent release of that lock. The lock request includes an identification of all regions affected by the intended I/O request. In addition, the I/O request may indicate whether the request is for a read or write operation. Multiple read operations may be granted locks simultaneously but only a single write I/O request may have temporary exclusive access to its affected regions. As noted, features and aspects hereof provide enhanced flexibility by allowing the storage controller to define the number of regions and the size of each region. Thus, application of features and aspects hereof within each particular storage controller application may be tuned in accordance with the performance needs of the particular storage system application.

One feature hereof provides a method operable in a storage controller of a storage system having a plurality of storage devices. The method comprising defining, within the storage controller, a plurality of regions within the storage capacity of the plurality of storage devices; and processing multiple I/O requests substantially concurrently within the storage controller to access information on the plurality of storage devices. The processing of each I/O request of the multiple I/O requests further comprises identifying at least one affected region, of the plurality of regions, affected by the I/O request to process; acquiring a lock for the at least one affected region to preclude conflicting access to the at least one affected region by processing of another I/O request; performing the I/O request to completion following acquisition of the lock; and releasing the lock following completion of the I/O request.

Another aspect hereof further provides that the at least one affected region comprises a plurality of affected regions and wherein the step of acquiring acquires the lock to preclude conflicting access to all of the plurality of affected regions.

Another aspect hereof further provides that the step of acquiring further comprises: determining whether the plurality of affected regions overlap any other currently locked regions; and waiting to acquire the lock until a determination that the plurality of affected regions do not overlap any other currently locked regions.

Another aspect hereof further provides that the step of waiting further comprises queuing wait information identifying the plurality of affected regions in a waiting queue until the determination that the plurality of affected regions do not overlap any other currently locked regions, and further provides that the step of acquiring further comprises removing the wait information from the waiting queue in response to the determination that the plurality of affected regions do not overlap any currently locked regions.

Another aspect hereof further provides that the step of releasing the lock further comprises using the wait information in the waiting queue to locate a next affected region awaiting acquisition of a lock; and repeating the step of acquiring for the one or more affected regions associated with the located next affected region.

Another aspect hereof further provides that the step of acquiring further comprises creating lock information indicating that the plurality of affected regions are now currently locked regions prior to process the I/O request.

Another aspect hereof further provides that the step of determining further comprises comparing information regarding the plurality of affected regions with lock information identifying any currently locked regions to determine whether any of the plurality of affected regions overlap any currently locked regions.

Another aspect hereof further provides that the step of releasing further comprises removing the lock information associated with the plurality of affected regions.

Another feature hereof provides a storage controller comprising a host interface element for receiving requests from an attached host system and for generating I/O requests associated with processing the host system requests; an internal request generator element for generating I/O requests associated with storage management performed by the storage controller; and an I/O request processing element associated with the host interface element and associated with the internal request generator and adapted to receive and process multiple generated I/O requests substantially concurrently. The I/O request processing element further comprises a region-based lock processing element to coordinate the concurrent processing of multiple I/O requests by locking one or more regions associated with each I/O request and wherein the regions are defined by the storage controller to permit flexible granularity of the defined regions.

Another aspect hereof further provides a memory for storing region-based data structures to record information regarding currently locked regions and requests waiting for completion of I/O requests involving currently locked regions.

Another aspect hereof further provides that the region-based data structures include locking information structures storing information regarding currently locked regions of the one or more regions.

Another aspect hereof further provides that the region-based data structures include waiting information structures storing information regarding I/O requests waiting to lock any portion of the one or more regions.

Another aspect hereof further provides that the waiting information structures are a waiting queue to queue information regarding I/O requests waiting to lock any portion of the one or more regions.

DETAILED DESCRIPTION OF THE DRAWINGS

Figure 1:
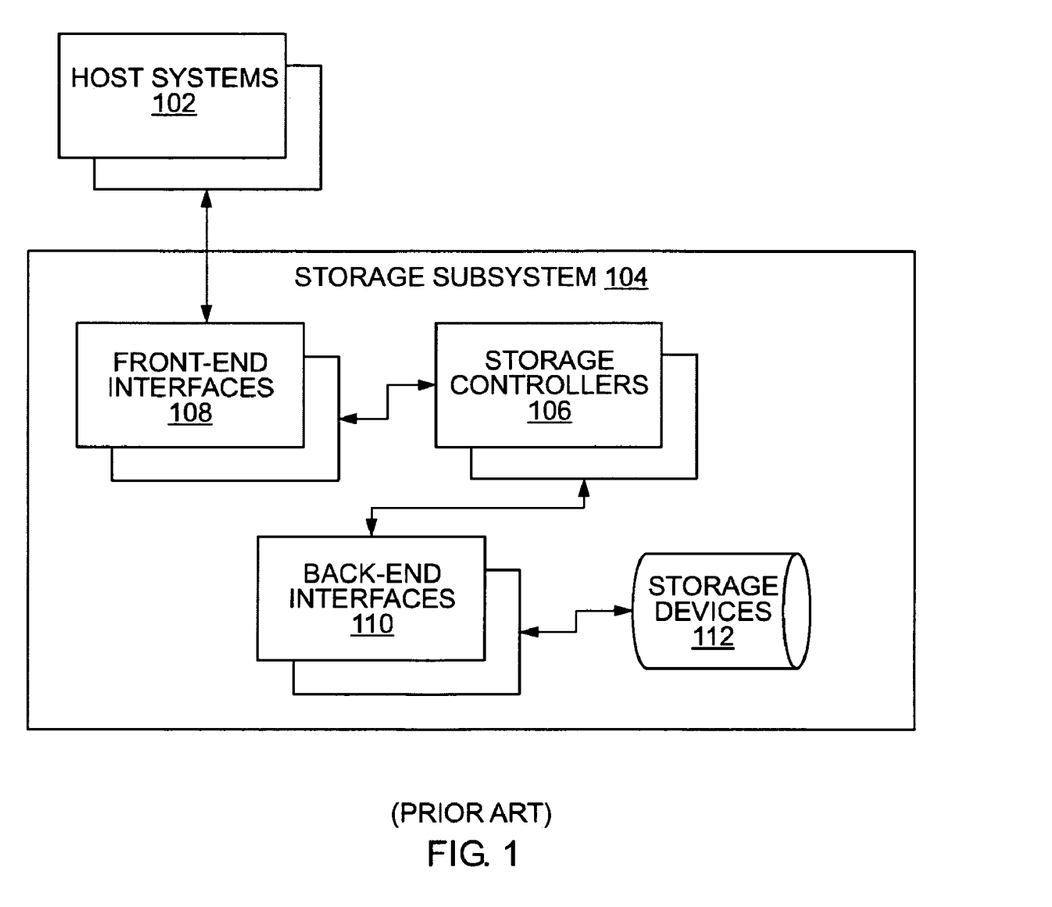
FIG. 1 is a block diagram of a typical storage subsystem as generally known in the art.

FIG. 1 is a block diagram of a tape typical storage subsystem 104 as presently known in the art. In general, a storage subsystem 104 couples to one or more host systems 102. Host systems 102 generate I/O requests for processing by storage subsystem 104 to store or retrieve data. Within storage subsystem 104, storage devices 112 persistently store the requested data. Storage devices 112 may be, for example, magnetic or optical disk drive devices or other computer interface storage devices such as semiconductors memory storage devices (often referred to as "RAM disks"). Storage controllers 106 perform control functions to manage overall operation of storage subsystem 104. Front-end interfaces 108 are associated with storage controllers 106 to provide interface capabilities with host systems 102. Typical interface features for coupling storage subsystem 104 to host systems 102 may include, for example, parallel SCSI, Fibre Channel, and other high speed parallel and serial communication standards and protocols. In like manner, back-end interfaces 110 are associated with storage controllers 106 to provide interface with and control of storage devices 112 on behalf of storage controllers 106. As above with respect to front-end interfaces 108, back-end interfaces 110 may permit use of parallel SCSI, Fibre Channel, and other high speed parallel and serial interface structures and protocols.

In general, storage controllers 106 receive requests generated by host systems 102 via front-end interfaces 108. Storage controllers 106 then perform appropriate processing to store or retrieve identified data associated with and identified by the received request. Storage controllers 106 then generate appropriate lower level I/O requests or operations for storing or retrieving the identified data on storage devices 112 via back-end interfaces 110. In processing the host system requests, storage controllers 106 may generate one or more lower level I/O requests or operations to perform the desired transfer of data. In addition, as noted above, various storage management techniques including, for example, RAID storage management, may generate still other I/O requests to perform various storage management functions as distinct from I/O requests generated directly in response to receipt of an request from a host system 102. For example, where the storage controllers 106 performs RAID storage management, internally generated I/O requests may relate to regeneration or rebuilding of information following replacement of the failed disk drive as well as other internally generated I/O request based on storage management features.

Those of ordinary skill in the art will readily recognize that FIG. 1 is intended merely as representative of a typical storage subsystem as presently known in the art. Numerous equivalent structures and processes will be readily apparent to those of ordinary skill in the art that also provide storage management capabilities and features. In particular, the functional decomposition of elements within the storage subsystem 104 as shown in FIG. 1 is intended merely as exemplary of one possible such functional decomposition. Front-end interfaces 108 and back-end interfaces 110 may each be tightly integrated with structures and processes represented by storage controllers 106. Such segregation or integration of functional elements within the storage subsystem are readily known design choices for those of ordinary skill in the art. Further, those of ordinary skill in the art will readily recognize that any number of storage controllers may be configured within a typical storage subsystem and may be associated with any number of front end and back-end interface elements. Still further, any number of storage devices may be provided within such an exemplary storage subsystem.

As noted above and as presently practiced in the art, a storage controller concurrently processing one or more I/O requests (whether responsive to a host request or generated internally for storage management) must provide some mechanism to coordinate concurrent processing of the various requests to preclude conflicts that may damage data integrity. For example, multiple read requests may be processed substantially concurrently even if the requests represent overlapping areas of stored data. However, a write request must be processed in a manner that precludes improper erroneous reading of data as interim progress is made in the write request and must preclude other write requests from erroneously conflicting with a currently processing write to request. As further noted above, present practices generally utilize a locking scheme to avoid such conflicts. However, current locking structures and methods require large granularity in the locking mechanism. For example, current techniques provide for locking an entire logical volume while processing each low level I/O request so as to preclude potential conflicts. Other presently known techniques provide for locking an entire stripe (where striping is utilized) to preclude conflicts in performing concurrent I/O operations within a particular stripe. Smaller layers of granularity have been thus far precluded by complexity and associated performance requirements for storage subsystems.

Figure 2:
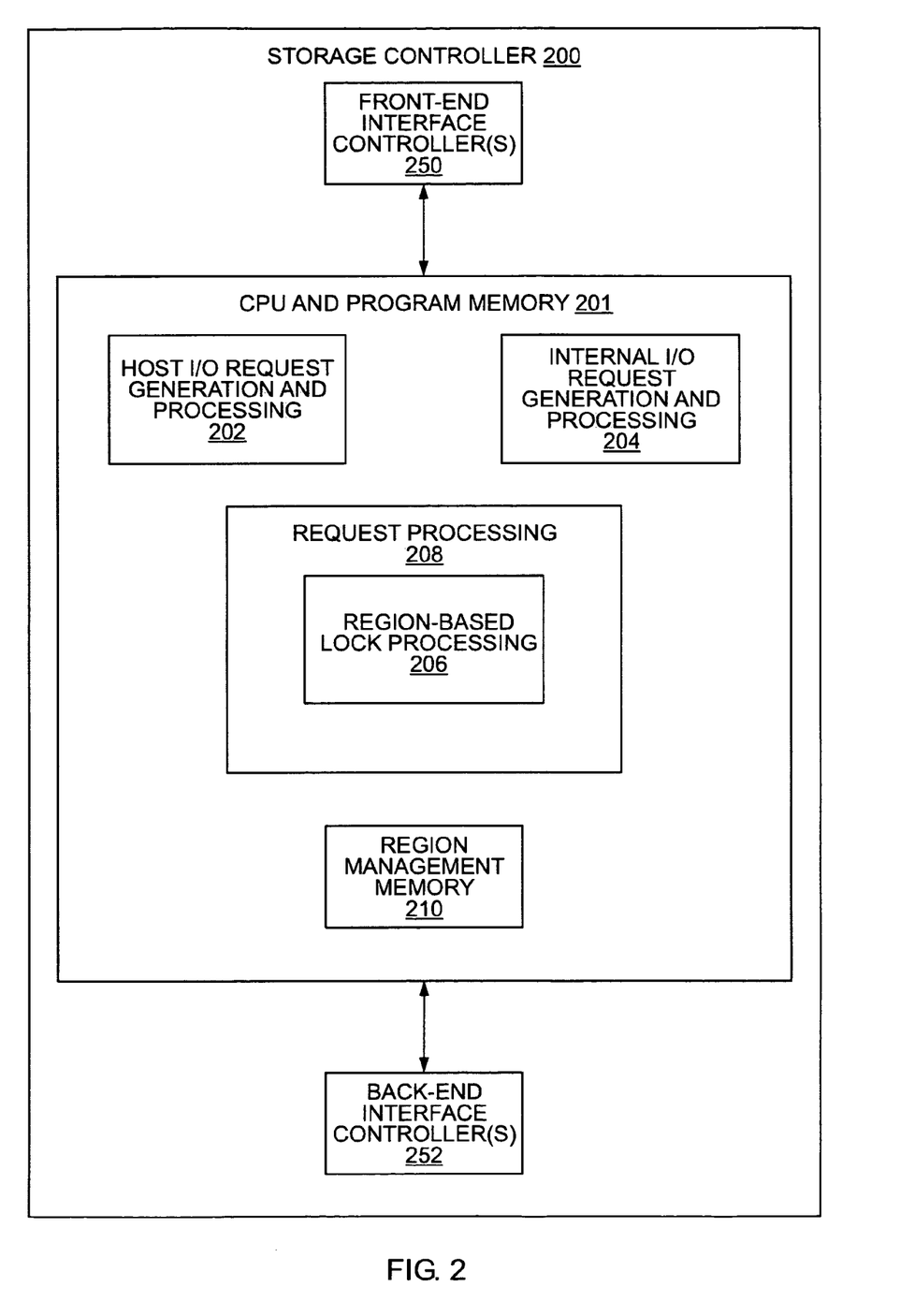
FIG. 2 is a block diagram of an exemplary storage controller enhanced in accordance with features and aspects hereof to provide region-based locking.

FIG. 2 shows a storage controller 200 enhanced in accordance with features and aspects hereof to utilized region-based locking structures and protocols such that any desired level of granularity may be achieved within the storage controller locking mechanisms while maintaining desired levels of performance in the storage subsystem. More specifically, storage controller 200 may include a front-end interface controller 250 and a back-end interface controller 252 for coupling the storage controller 202 host systems and storage devices, respectively. As noted above with respect to FIG. 1, those of ordinary skill in the art will recognize that the front-end interface controller 250 and back-end interface controller 252 may be integrated within storage controller 200 or may be separated out as independent control circuits and structures. A CPU and associated program memory 201 may include a variety of functional elements for processing requests received from attached host systems via front-end interface controller 250 and for generating and processing other I/O requests internally for purposes effectuating storage management features. CPU and program memory 201 therefore may include element 202 for I/O request processing to generate and perform lower level I/O requests in response to receipt of host system requests. CPU and program memory element 201 may also include element 204 for processing I/O requests generated by storage management features of the controller 200. Both sources of generated I/O requests apply the generated requests to an I/O request processing element 208 where the requests may be substantially concurrently performed. One common design paradigm for such concurrent processing is to logically replicate multiple copies of the I/O request processing element 208—one for each I/O request being performed. Such concurrent or parallel programming techniques are well known to those of ordinary skill in the art. Further, those of ordinary skill in the art will recognize that a plurality of host I/O request generation and processing elements 202 and internal I/O request generation and processing elements 204 may be provided within storage controller 200 to enabled multiple paths for generating and processing such I/O requests.

In accordance with features and aspects hereof, I/O request processing element 208 may include region-based lock processing element 206 to permit flexibility in the granularity of locking as desired for any particular storage controller application. Region-based lock processing element 206 provides for dynamically defining the number of regions within the storage capacity managed by storage controller 200 and thus also controlling the size of each defined region. I/O request processing element 208 then interacts with the region-based block processing element 206 to coordinate concurrent processing of multiple I/O requests. The region-based lock processing element 206 may be used to acquire a lock of one or more regions of the storage capacity prior to performing an I/O operation that affects those regions and may be used to release such a previously acquired lock.

Region-based lock processing element 206 may generate and manage region-based information in an associated region management memory element 210. Information stored in memory 210 may include lock information indicating regions that are currently locked and associating those regions with the I/O request that is affecting those regions. The memory 210 may also include waiting information (e.g., a waiting queue structure) to store information regarding lock acquisition requests that are awaiting release of earlier acquired locks for regions affected by the pending request.

Figure 6:
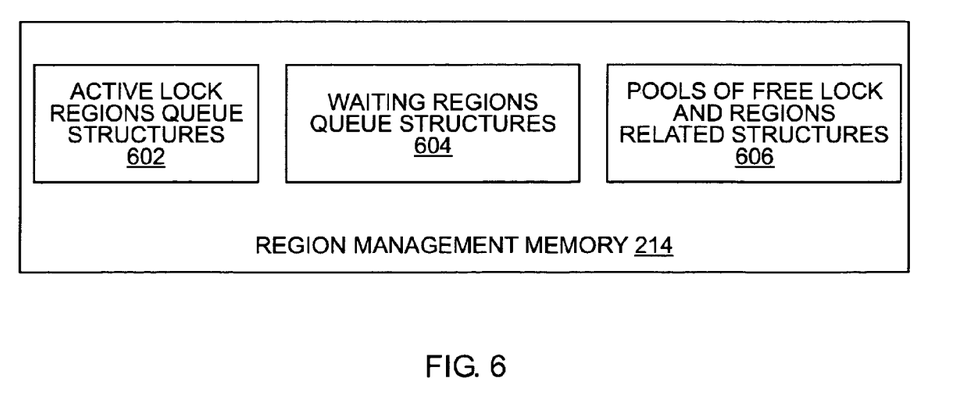
FIG. 6 is a block diagram providing additional exemplary details of the Region-Based memory structures of FIG. 2.

FIG. 6 provides some additional exemplary details regarding typical contents of the region management memory element 210. Memory 210 may include data structures storing information regarding active lock regions 602 as well as a queue structure 604 for storing information regarding lock requests waiting for successful acquisition. Still further, memory 210 may include queues or pools 606 of free lock related data structures and region related data structures relating to regions not presently locked for processing of any particular I/O request. Other structures depicted in FIG. 6 are well known to those of ordinary skill in the art as exemplary structures for managing the lock information. For example, hash table may represent a vector of pointer representing the head of a list of lock information structures. The entries may sparsely populate the vector and hence a hash algorithm may be employed to rapidly identify a list from a provided hash key value. Those of ordinary skill in the art will recognize a wide variety of specific structures and associated processing techniques for representing presently locked regions and other regions awaiting acquisition of a lock. The structures suggested by FIGS. 2 and 6 are therefore intended merely as exemplary of one possible embodiment for implementing features and aspects hereof.

The following data structures exemplify data structures as may be stored in region management memory 210 useful for storing and maintaining locked information regarding currently locked regions (i.e., affected by some I/O request presently being performed by the storage controller) and information regarding requests waiting to lock their respective affected regions. Those of ordinary skill in the art will recognize a wide variety of equivalent data structures capable of maintaining such stored information to manage Region-based Locke processing.

A Lock data structure identifies the affected regions associated with the lock request for a corresponding I/O operation. In particular, the Lock structure may store information regarding the type of corresponding I/O operation (e.g., read or write operation), a handle or ID for the lock, and pointers to region structures for all the affected regions that must be locked for the corresponding I/O operation to proceed.

Lock Data Structure (exemplary):

| 31 | 3 | 24 23 | 2 | 16 15 | 1 | 8 7 | 0 | 0 | Bit/Byte |
|---|---|---|---|---|---|---|---|---|---|
| flag | Rsvd | cmd | | NumRegions | | LockHandle | | | 0x00 |
| | | | Pointer to Lock Callback function | | | | | | 0x04 |
| | | | Pointer to NextLockWaitQ | | | | | | 0x08 |
| | | | Pointers to Region0 structure | | | | | | 0x0C |
| | | | ... | | | | | | 0x10 |
| | | | ... | | | | | | 0x14 |
| | | | Pointers to Region(numRegions-1) structure | | | | | | ... |

| Field | Description |
|---|---|
| LockHandle | This is the RAID volume number for locking the regions |
| NumRegions | Number of regions to be locked |
| Cmd | Read OR Write |
| Flag | Specify Bit 0 → Locked (1) or Unlocked(0) |
| Pointer to Lock Callback function | This is the callback routine address |
| Pointer to NextLockWaitQ | Address pointing to Next Lock Wait Q while waiting for LockHead message |
| Pointers to array of Region structures | Array of addresses pointing to the numRegions |

A Region data structure stores information regarding locks and waiting locks associated with a corresponding particular region of the storage subsystem.

Region Data Structure (exemplary):

| 31 | 3 | 24 23 | 2 | 16 15 | 1 | 8 7 | 0 | 0 | Bit/Byte |
|---|---|---|---|---|---|---|---|---|---|
| | | | | RegionNumber | | | | | 0x00 |
| | | | | Pointer to Lock structure | | | | | 0x04 |
| | | | | Pointer to LockHead structure | | | | | 0x08 |
| | | | | Pointer to NextWaitQRegion | | | | | 0x0C |
| | | | | Pointer to PrevLockedRegion | | | | | 0x10 |
| | | | | Pointer to NextLockedRegion | | | | | 0x14 |

| Field | Description |
|---|---|
| RegionNumber | This is the region number |
| Pointer to Lock structure | Address pointing to the associated LOCK structure |
| Pointer to LockHead structure | Address pointing to the associated LOCKHEAD locking module resource |
| Pointer to NextWaitQRegion | Address pointing to Next Region in the Wait Queue |
| Pointer to PrevLockedRegion | Address pointing to Previous Region in the Locked Queue |
| Pointer to NextLockedRegion | Address pointing to Next Region in the Locked Queue |

A LockHead structure stores information regarding a queue of region structures such as a presently locked list of affected regions or a list of affected regions associated with a pending/waiting lock request.

| LockHead Data Structure (exemplary): | | | | | | | | |
|---|---|---|---|---|---|---|---|---|
| 31 | 3 | 24 23 | 2 | 16 15 | 1 | 8 7 | 0 | 0 Bit/Byte |
| Rsvd | | rsvd | | rsvd | | cmd | | 0x00 |
| LockHeadHandle | | | | numCmdsLocked | | | | 0x04 |
| regionNumber | | | | | | | | 0x08 |
| Pointer to Next LockHead structure | | | | | | | | 0x0C |
| Pointer to WaitQRegionHead | | | | | | | | 0x10 |
| Pointer to WaitQRegionTail | | | | | | | | 0x14 |
| Pointer to LockedRegionHead | | | | | | | | 0x18 |
| Pointer to LockedRegionTail | | | | | | | | 0x20 |

| Field | Description |
|---|---|
| cmd | Current command (Read OR Write) that is in the LOCKHEAD |
| numCmdsLocked | Number of commands that are currently locked for this LOCKHEAD |
| LockHeadHandle | LockHead Handle-Msg Number(Unique Id) |
| regionNumber | First locked region number for this LOCKHEAD |
| Pointer to Next LockHead structure | Address pointing to Next LockHead in the Hash Queue |
| Pointer to WaitQRegionHead | Address pointing to Head of the Wait Queue Region |
| Pointer to WaitQRegionTail | Address pointing to Tail of the Wait Queue Region |
| Pointer to LockedRegionHead | Address pointing to Head of the Locked Queue Region |
| Pointer to LockedRegionTail | Address pointing to Tail of the Locked Queue Region |

Figure 3:
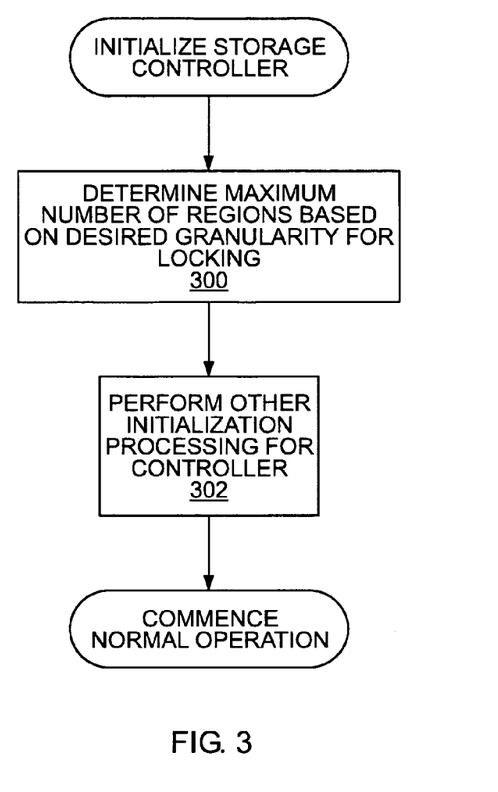
FIGS. 3-5 are flowcharts describing exemplary methods in accordance with features and aspects hereof operable in a storage controller to provide region-based locking.
Figure 4:
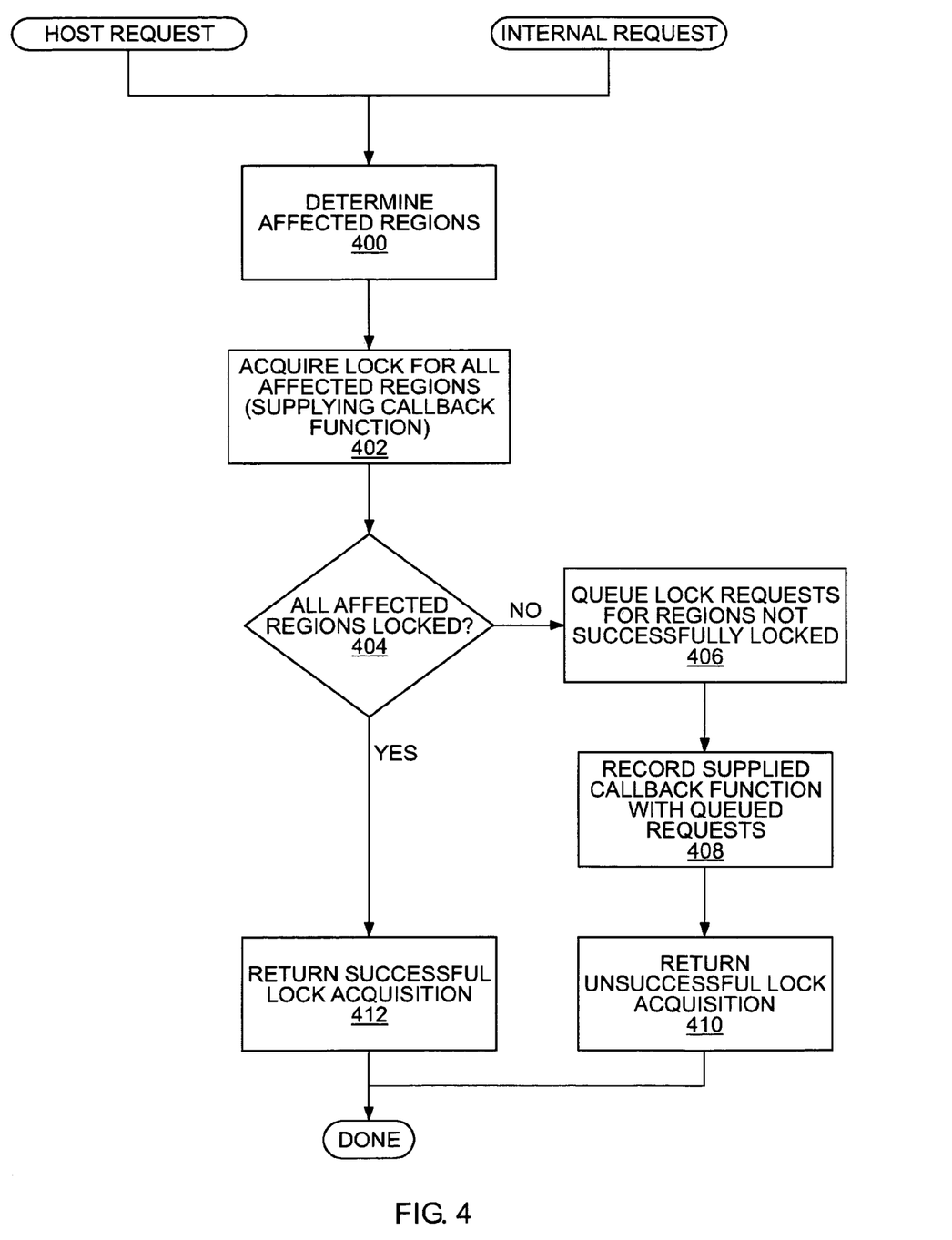
Figure 5:
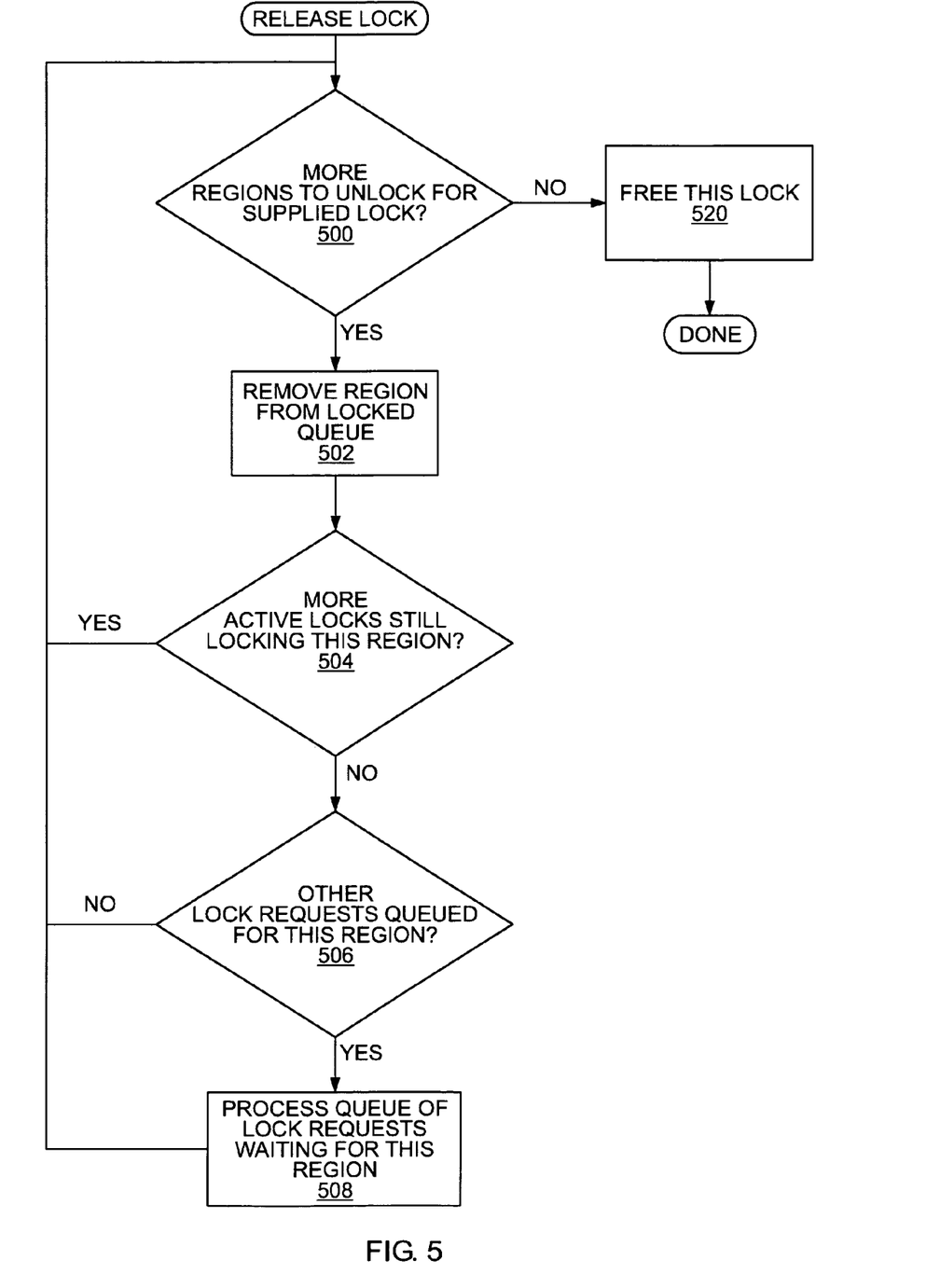

FIGS. 3 through 5 are flowcharts describing exemplary methods operable within a storage controller enhanced in accordance with features and aspects hereof to provide flexible granularity in the locking of defined regions of a storage system. In particular, FIG. 3 shows processing useful during initialization of the storage controller to initially define regions at an appropriate level of granularity for the particular storage controller application. Element 300 therefore determines the maximum number of regions based on the desired granularity for locking. For example, where stripes in a striped storage system contain 64 KB of information, each such stripe or row may be subdivided into 4 regions, for example, each representing 16 KB of the total stripe. Thus, the maximum number of regions in such an exemplary application may be 4 times the number of stripes in the striped storage system logical volume. Each such region may be identified by a region-number or index value from zero through the number of regions minus one. The particular level of granularity for a particular storage controller application may be determined as a matter of design choice by those of ordinary skill in the art. Further, the processing at initialization may determine the desired size of each region and thereby determine the maximum number of regions, till further, those of ordinary skill in the art will recognize that the number and size of regions may be determined dynamically as the storage system is in operation. At appropriate times in operation of the storage system, the storage controller may determine that it is beneficial to alter the granularity of regions defined for purposes of locking. Any number of factors well known to those of ordinary skill in the are may enter into such a determination whether determined once at initialization or dynamically at any re-initialization of the storage controller.

The initialization processing of element 200 may also serve to initialize the data structures in the region management memory to allow proper operation of the region locking management functions as discussed further herein below. Such initialization may include, for example, indications that all regions are presently unlocked.

Having so determined the number of regions and thus inherently the index value used to identify each defined region, element 302 is then operable to perform other initialization processing for the storage controller. The other processing may include any processing required to ready the storage controller for normal operation. Those of ordinary skill in the art will recognize that the ordering of steps 300 and 302 is not critical and may be in any desired order appropriate for the particular initialization sequence. For example, processing shown as element 300 may be integrated with other initialization of element 302.

FIG. 4 represents processing in accordance with features and aspects hereof to perform a received request for reading or writing of data in the storage subsystem. As noted above, such requests may be generated external to the storage controller by an attached host system and received by the controller from such an external system. In addition, such requests may be generated internal to the storage controller for purposes of various aspects of storage management associated with logical volumes of the storage system. All such requests may be processed concurrently by processing such as that of FIG. 4 within a storage controller. Thus, FIG. 4 represents processing of a single such concurrent thread or process operable within the storage controller. Multiple such threads or processes may be concurrently operable within a storage controller for processing multiple requests. Such multiprocessing and multiple thread programming techniques are well known to those of ordinary skill in the art. The method or thread is invoked or instantiated by a calling function or process. The calling function or process is responsible for performing a particular I/O request (generated internally or externally) and first attempts to acquire a lock for the regions affected by the I/O request. Once a lock is acquired, the I/O request may be performed to completion and the acquired lock may be later released.

Element 400 of the depicted exemplary thread is first operable to determine the number of affected regions affected by the received request. Each received request may affect one or more defined regions from among the plurality of regions defined in this storage controller application. The multiple regions affected by this request may be contiguous within the space of the storage system or may be noncontiguous or scattered throughout the storage capacity of the storage system. Having so determined the number of affected regions associated with this request, element 402 is then operable to acquire a lock associated with all of the affected regions. In one exemplary embodiment, the function or process that invoked this request to acquire a lock may provide a callback function to be invoked when all affected regions are successfully locked. Such a callback function programming paradigm is but one exemplary embodiment of features and aspects hereof. Numerous equivalent programming techniques will be readily apparent to those of ordinary skill in the art.

Element 404 next determines whether a lock was successfully acquired for all affected regions. If so, element 412 is operable to return a successful lock acquisition status to the invoking process. If not, element 406 is next operable to queue or otherwise store a pending lock request for the regions not successfully locked by operation of element 402. The queued entry may contain information identifying the regions to be locked and information regarding the I/O request that generated the lock acquisition request. Element 408 is then operable to record the supplied callback function, if any, with the queue entry. As noted above, one exemplary embodiment may provide a callback function from the invoking process. When the required lock of the identified regions cannot be immediately obtained, the callback function will be invoked at a later time when the regions associated with the I/O request may all be successfully locked. Lastly, element 410 is operable to return an unsuccessful lock acquisition status to the invoking function. The invoking function will then await a call to the supplied callback function before continuing operations on the affected regions.

FIG. 5 is a flowchart describing an exemplary process associated with features and aspects hereof to release a previously acquired lock. As noted above, once the lock has been acquired by an invoking function, processing of the I/O request impacting the affected regions may precede to completion. The invoking process may then call the exemplary release lock method of FIG. 5 to release the locked regions permitting other pending I/O operations to proceed. As noted above, additional I/O requests may conflict with presently locked regions and hence may be queued in a waiting queue structure until required regions are available and unlocked. Thus, in addition to unlocking regions following completion of I/O request processing, the method of FIG. 5 also determines whether any waiting queued entry may now proceed based on the release of this currently locked set of affected regions for a just completed I/O request.

Element 500 is first operable to determine whether additional lock regions associated with this presently supplied lock entry remain to be unlocked. If not, the lock entry structure may be released or freed by operation of element 520 and all regions associated with the lock will have been released for use by other pending or future requests. If element 500 determines that still more affected regions associated with the supplied lock must be released, element 502 is operable to remove the next region associated with the supplied lock from the queue of regions associated with this lock entry. For the region just unlocked by operation of element 502, element 504 determines whether other presently active locks still retain an active lock of this region. As noted above, a plurality of read I/O operations may all proceed substantially concurrently—each having a lock associated with its affected regions. Since multiple concurrent read I/O operations may be concurrently active, the various affected regions associated with each operation may overlap. Thus, multiple locks may be associated with any particular region. If element 504 determines that additional active locks still remain for the region just processed by element 502, the region is not yet free from all locks. Processing continues by looping back to element 500 to determine if additional regions associated with this lock need be released. Otherwise, element 506 is next operable to determine whether any entries are queued in a waiting queue structure for release of this region. If no other lock requests are queued for this region in an associated waiting queue structure, processing again loops back to element 500 to determine if other affected regions associated with this lock need be released. If element 506 determines that other lock requests are pending in a waiting queue structure associated with this region, element 508 is next operable to process the queue of such waiting lock requests that may affect this region. Such processing may determine which if any of the queued waiting requests may proceed by virtue of unlocking this region. Processing then continues looping back to element 500 to determine whether additional affected regions associated with this lock need be released. When all affected regions associated with this lock have been successfully released and any pending requests waiting for such release have been processed, the process of releasing a lock request is completed.

Processing to evaluate the queue of waiting entries as each affected region is released may proceed in accordance with standard queue processing techniques readily apparent to those of ordinary skill in the art. In particular, processing of the queue of waiting lock requests may proceed in such a manner as to avoid potential deadlock situations where a lock request can never be completed. For example, the queue of waiting lock requests may simply be processed by allowing only the first entry in the queue to proceed as affected regions are released from prior lock requests. In other words, queued lock requests will always proceed in sequential order according to the order in which they are received by the storage controller performing region-based lock processing.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a storage controller of a storage system having a plurality of storage devices, the method comprising:

defining, within the storage controller, a plurality of regions within the storage capacity of the plurality of storage devices; and processing multiple block I/O requests substantially concurrently within the storage controller to access information on the plurality of storage devices, wherein the processing of each block I/O request of the multiple block I/O requests further comprises:

identifying at least one affected region, of the plurality of regions, affected by the block I/O request to process wherein the identified region comprises one or more blocks identified in the block I/O request;

acquiring a lock for the at least one affected region to preclude conflicting access to the at least one affected region by processing of another block I/O request;

performing the block I/O request to completion following acquisition of the lock; and releasing the lock following completion of the block I/O request.

2. The method of claim 1 wherein the at least one affected region comprises a plurality of affected regions and wherein the step of acquiring acquires the lock to preclude conflicting access to all of the plurality of affected regions.

3. The method of claim 2 wherein the step of acquiring further comprises:

determining whether the plurality of affected regions overlap any other currently locked regions; and waiting to acquire the lock until a determination that the plurality of affected regions do not overlap any other currently locked regions.

4. The method of claim 3
wherein the step of waiting further comprises queuing wait information identifying the plurality of affected regions in a waiting queue until the determination that the plurality of affected regions do not overlap any other currently locked regions, and
wherein the step of acquiring further comprises removing the wait information from the waiting queue in response to the determination that the plurality of affected regions do not overlap any currently locked regions.

5. The method of claim 4 wherein the step of releasing the lock further comprises:
using the wait information in the waiting queue to locate a next affected region awaiting acquisition of a lock; and
repeating the step of acquiring for the one or more affected regions associated with the located next affected region.

6. The method of claim 3 wherein the step of acquiring further comprises:
creating lock information indicating that the plurality of affected regions are now currently locked regions prior to process the block I/O request.

7. The method of claim 6 wherein the step of determining further comprises:
comparing information regarding the plurality of affected regions with lock information identifying any currently locked regions to determine whether any of the plurality of affected regions overlap any currently locked regions.

8. The method of claim 7 wherein the step of releasing further comprises:
removing the lock information associated with the plurality of affected regions.

9. A storage controller comprising:
a storage device interface configured to couple the storage controller to a plurality of storage devices;
a host interface element configure to receive requests from an attached host system and for generating block I/O requests associated with processing the host system requests;
an internal request generator element for generating block I/O requests associated with storage management performed by the storage controller; and
an block I/O request processing element associated with the host interface element and associated with the internal request generator and adapted to receive and process multiple generated block I/O requests substantially concurrently wherein the block I/O requests request access to storage devices coupled to the controller,
wherein the block I/O request processing element further comprises a region-based lock processing element to coordinate the concurrent processing of multiple block I/O requests by locking one or more regions associated with each block I/O request and wherein the regions are defined by the storage controller within storage capacity of storage devices coupled to the storage controller and permit flexible granularity of the defined regions wherein each region comprises one or more blocks identified in a block I/O request.

10. The storage controller of claim 9 further comprising:
a memory for storing region-based data structures to record information regarding currently locked regions and requests waiting for completion of block I/O requests involving currently locked regions.

11. The storage controller of claim 10 wherein the region-based data structures include locking information structures storing information regarding currently locked regions of the one or more regions.

12. The storage controller of claim 10 wherein the region-based data structures include waiting information structures storing information regarding block I/O requests waiting to lock any portion of the one or more regions.

13. The storage controller of claim 12 wherein the waiting information structures are a waiting queue to queue information regarding block I/O requests waiting to lock any portion of the one or more regions.

14. A storage controller operable in a storage system having a plurality of storage devices, the storage controller comprising:
means, within the storage controller, for defining a plurality of regions within the storage capacity of the plurality of storage devices; and
means for processing multiple block I/O requests substantially concurrently within the storage controller to access information on the plurality of storage devices, wherein the means for processing of each block I/O request of the multiple block I/O requests further comprises:
means for identifying at least one affected region, of the plurality of regions, affected by the block I/O request to process wherein the identified region comprises one or more blocks identified in the block I/O request;
means for acquiring a lock for the at least one affected region to preclude conflicting access to the at least one affected region by processing of another block I/O request;
means for performing the block I/O request to completion following acquisition of the lock; and
means for releasing the lock following completion of the block I/O request.

15. The controller of claim 14 wherein the at least one affected region comprises a plurality of affected regions and wherein the means for acquiring acquires the lock to preclude conflicting access to all of the plurality of affected regions.

16. The controller of claim 15 wherein the means for acquiring further comprises:
means for determining whether the plurality of affected regions overlap any other currently locked regions; and
means for waiting to acquire the lock until a determination that the plurality of affected regions do not overlap any other currently locked regions.

17. The controller of claim 16
wherein the means for waiting further comprises means for queuing wait information identifying the plurality of affected regions in a waiting queue until the determination that the plurality of affected regions do not overlap any other currently locked regions, and
wherein the means for acquiring further comprises means for removing the wait information from the waiting queue in response to the determination that the plurality of affected regions do not overlap any currently locked regions.

18. The controller of claim 17 wherein the means for releasing the lock further comprises:
means for using the wait information in the waiting queue to locate a next affected region awaiting acquisition of a lock; and
means for repeating operation of the means for acquiring for the one or more affected regions associated with the located next affected region.

19. The controller of claim 16 wherein the means for acquiring further comprises:
means for creating lock information indicating that the plurality of affected regions are now currently locked regions prior to process the block I/O request.

20. The controller of claim 19 wherein the means for determining further comprises:

means for comparing information regarding the plurality of affected regions with lock information identifying any currently locked regions to determine whether any of the plurality of affected regions overlap any currently locked regions.

21. The controller of claim 20 wherein the means for releasing further comprises:

means for removing the lock information associated with the plurality of affected regions.

* * * * *